(No Model.) 6 Sheets—Sheet 1.
B. T. MESKER.
BUILDING FRONT.
No. 435,761. Patented Sept. 2, 1890.
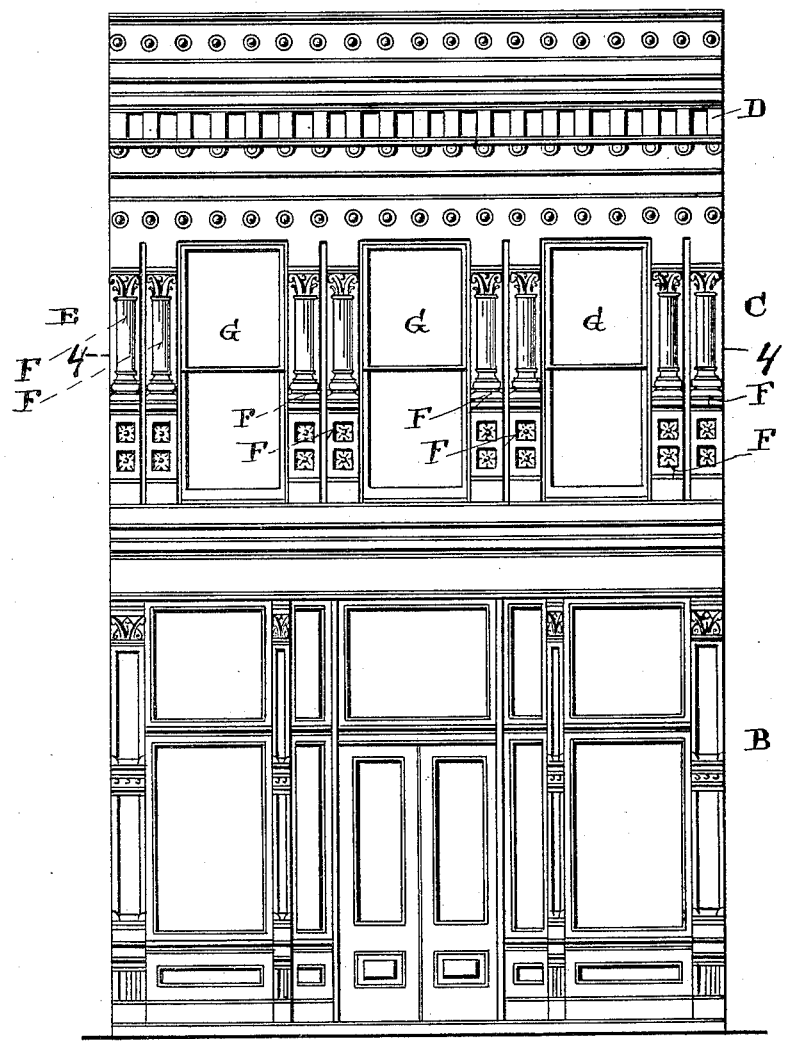
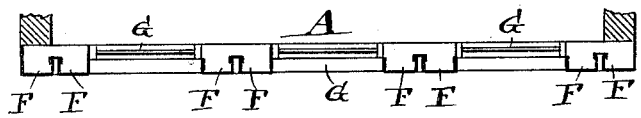
WITNESSES:
INVENTOR
Bernard T. Mesker
BY
C. D. Moody
ATTORNEY (No Model.) 6 Sheets—Sheet 2.

B. T. MESKER.
BUILDING FRONT.

No. 435,761. Patented Sept. 2, 1890.

WITNESSES:

INVENTOR
Bernard T. Mesker
BY C. D. Moody
ATTORNEY

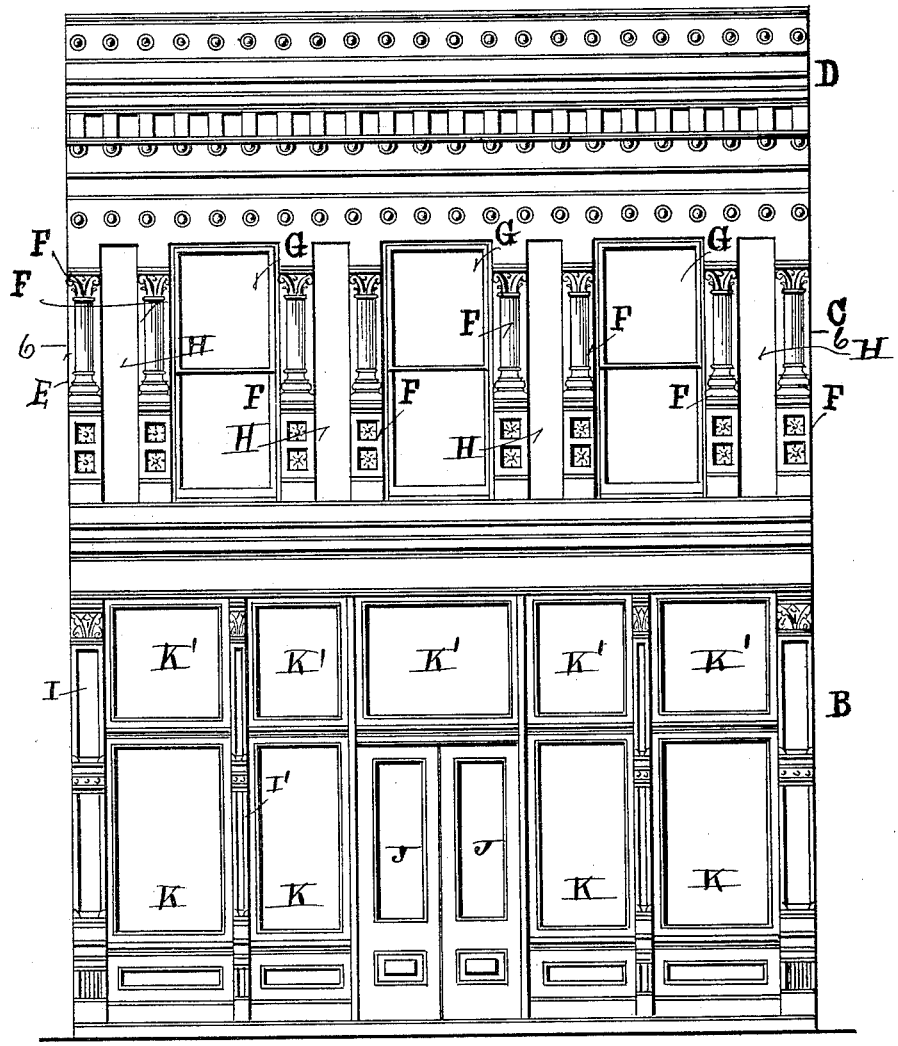

(No Model.) 6 Sheets—Sheet 4.
B. T. MESKER.
BUILDING FRONT.
No. 435,761. Patented Sept. 2, 1890.
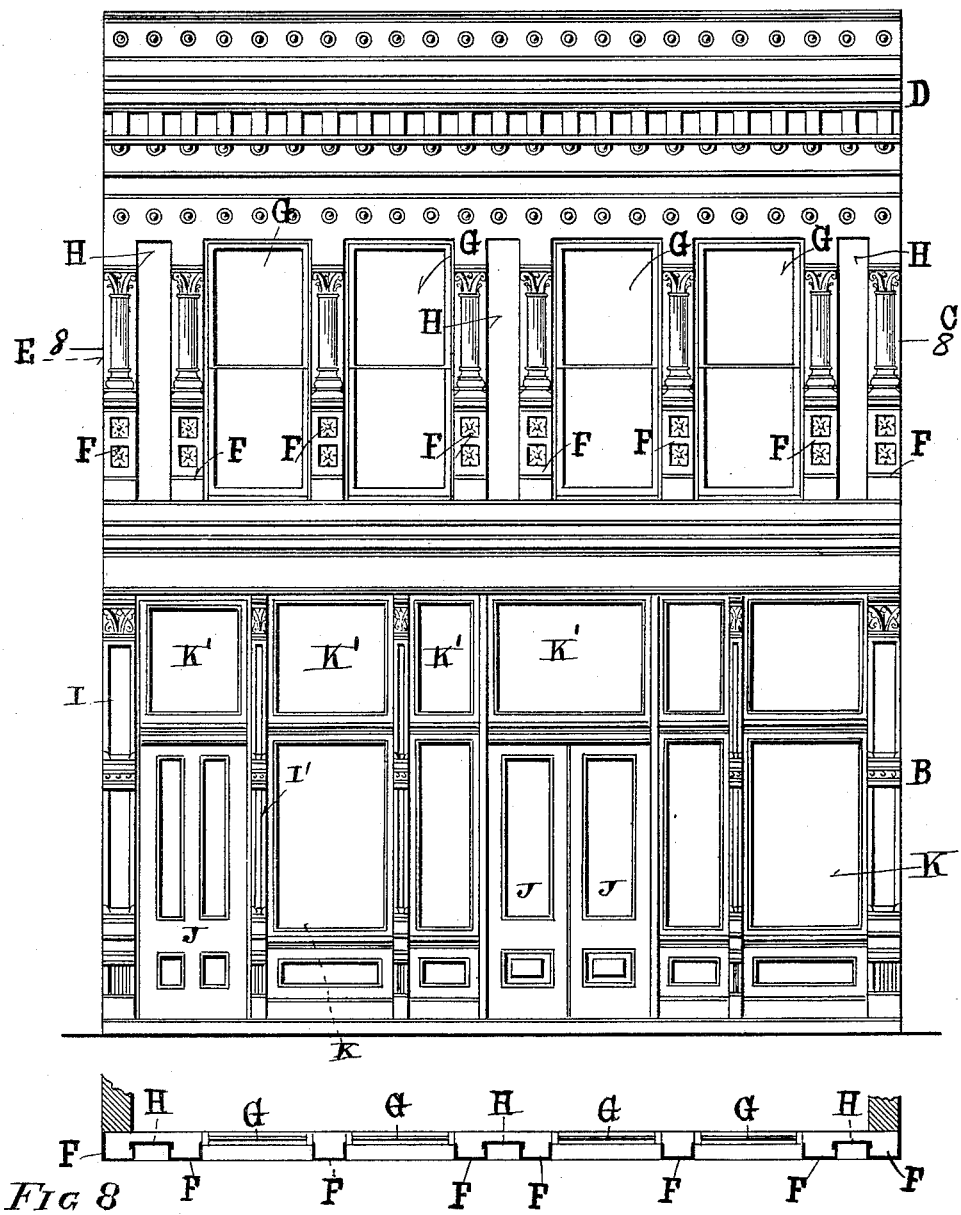
WITNESSES:
INVENTOR
Bernard T. Mesker
BY L. D. Mooly
ATTORNEY (No Model.)  
B. T. MESKER.  
BUILDING FRONT.  
No. 435,761.  
Patented Sept. 2, 1890.  
6 Sheets—Sheet 5.
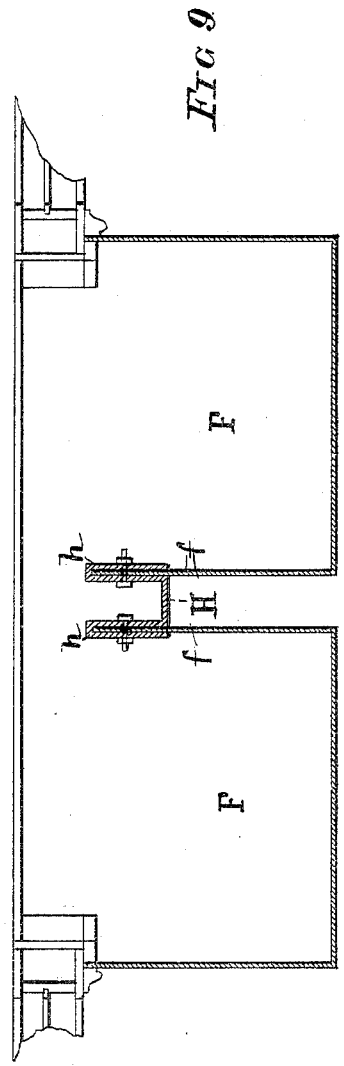
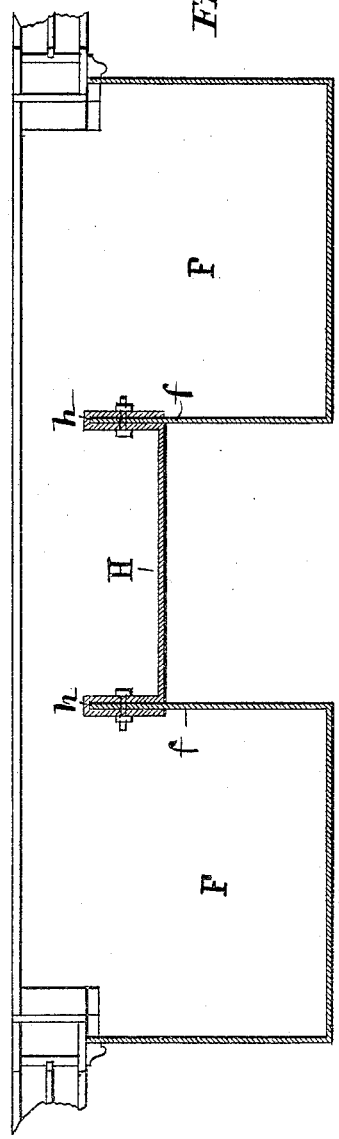
WITNESSES:
INVENTOR
Bernard T. Mesker
BY
ATTORNEY (No Model.) 6 Sheets—Sheet 6.

B. T. MESKER.
BUILDING FRONT.

No. 435,761. Patented Sept. 2, 1890.

WITNESSES:

INVENTOR
Bernard T. Mesker
BY
C. D. Moody
ATTORNEY

UNITED STATES PATENT OFFICE.

BERNARD T. MESKER, OF ST. LOUIS, MISSOURI.

BUILDING-FRONT.

SPECIFICATION forming part of Letters Patent No. 435,761, dated September 2, 1890.

Application filed December 19, 1889. Serial No. 334,256. (No model.)

*To all whom it may concern:*

Be it known that I, BERNARD T. MESKER, of St. Louis, Missouri, have made a new and useful Improvement in Building-Fronts, of which the following is a full, clear, and exact description.

This improvement has for its object to provide means whereby building-fronts of different widths can be readily and economically constructed.

The improvement relates to that class of building-fronts which, saving the windows and doors thereof, are composed substantially of sheet and plate and cast metal; and it has to do more especially with that portion of the front which is included between the first story and the entablature of the story above.

The improved building-front is substantially a new manufacture kept in stock to be sold as any article of merchandise—namely, a building-front of the class described—and for its leading feature having its portion referred to—namely, the portion between the top of the first story and the entablature of the second story—capable, within certain limits, as hereinafter described, of being readily widened and narrowed, and thereby made to suit a building wider or narrower, as the case may be, substantially as is hereinafter set forth and claimed, aided by the annexed drawings, making part of this specification, in which—

Figures 1, 2, 3, and 7 are front elevations of the improved building-front, and respectively showing the front in three different widths; Figs. 4, 5, 6, and 8, respectively, horizontal sections on the lines 4 4, 5 5, 6 6, 7 7 of Figs. 1, 2, 3, and 4, respectively; and Figs. 9 and 10, details upon an enlarged scale, Fig. 9 being a horizontal section of a pair of principal columns and an included sub-column, and Fig. 10 being a similar section, but showing a wider sub-column; and Figs. 11 to 22, sections of modifications.

The same letters of reference denote the same parts.

Figure 2:
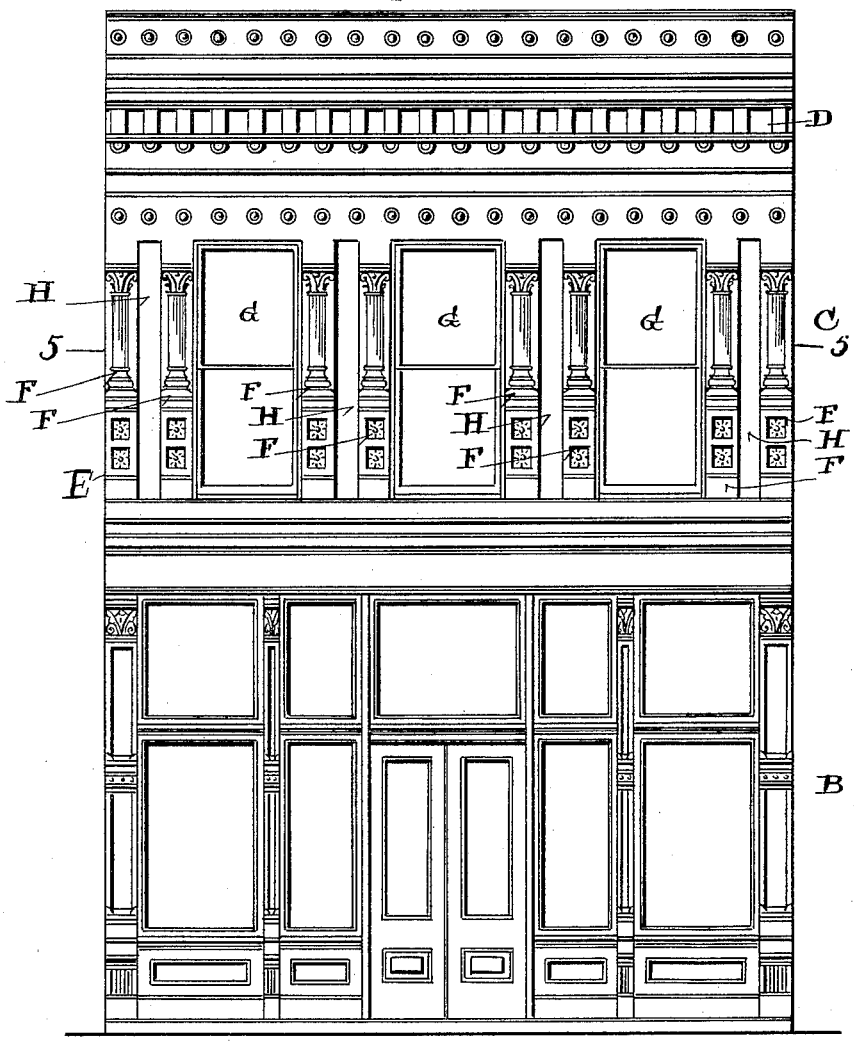
Figure 5:
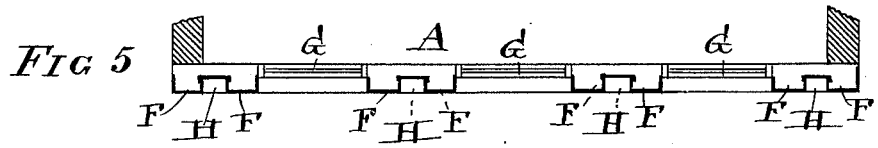
Figure 11:
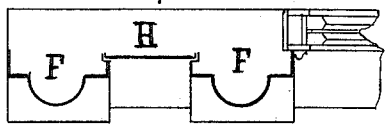
Figure 12:
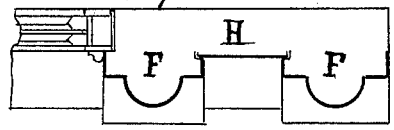
Figure 13:
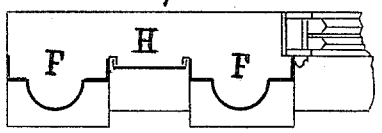
Figure 14:
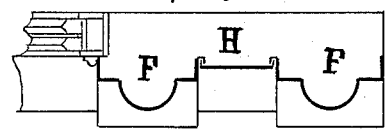
Figure 15:
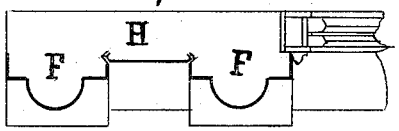
Figure 16:
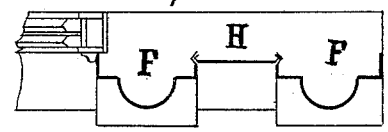
Figure 17:
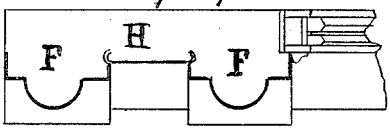
Figure 18:
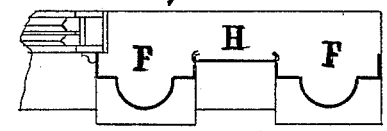
Figure 19:
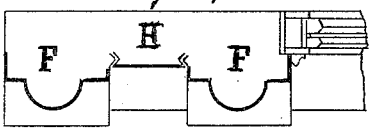
Figure 20:
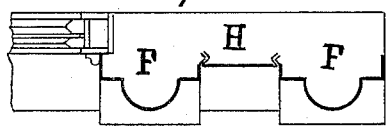
Figure 21:
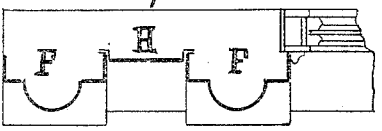
Figure 22:
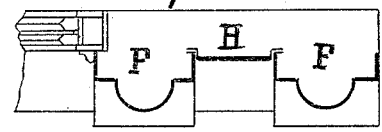

The building-front A, Figs. 1, 2, and 3, saving as it is modified or supplemented by the improvement under consideration, is of the usual description. B represents the first story thereof, and C the second story.

The leading feature of the improvement is, as stated, embodied in that portion of the front which is between the top of the first story and the entablature D of the second story. This portion E of the front is composed, mainly, of the principal columns F and the windows G. In the front shown there are eight such columns and three windows, and the same number of columns and windows appear in Figs. 1, 2, and 3. It will be observed, however, that the fronts shown, respectively, in Figs. 1, 2, and 3 are of different widths, the front shown in Fig. 1 being the narrowest, the front shown in Fig. 2 being wider, and the front shown in Fig. 3 being still wider. These variances in width are occasioned as follows:

H represents what I term a "sub-column." It is a part which can be introduced into the front or be omitted therefrom at will, and if introduced it can be of any width consistent with what is desirable, in an architectural sense, in a building-front. It does not appear in the front of Fig. 1. It appears in Fig. 2 of a certain width, and it appears in a wider form in Fig. 3. When the sub-column is not used, the principal columns F constitute substantially the solid or closed part of the front portion E. When the sub-column is used, it is united with the principal columns and forms an element of the closed portion of the front. The customary arrangement of the sub-column is between two principal columns, as shown in Figs. 2 and 3. When the sub-column is narrower, the adjoining principal columns are brought nearer together, and when the sub-column is wider the adjoining principal columns are correspondingly spaced farther apart. One or more of such sub-columns can be introduced into the front. In the front shown four sub-columns are employed, one with each pair of principal columns, as shown. The particular mode of uniting the sub-column with the principal columns is immaterial, so long as a union is properly effected and the aim of the improvement carried out, which is to widen the front portion E more or less to suit the width of the building-front. A suitable mode is shown in Figs. 9 and 10, the edges *h* of the sub-column being folded to admit the edges *f* of the principal columns, and the interlocking edges being suitably bolted together. The principal and sub-columns, at the bottom thereof, are suitably connected with the first-story construction, and at the top thereof with the entablature D. The details of such connections, being those commonly employed in sheet-metal work, need not now be repeated.

The entablature D in practice is prepared in sections of a certain length—say eight feet—and any desired length of entablature to go with a certain width of front portion E is produced by splicing the sections, or sections and a fractional part of section. The first-story construction is also so contrived that, to suit the front portion E and entablature D, it can be more or less widened.

The details of the first story and the method by which it can be made of different widths will form the subject-matter of a separate application for Letters Patent, and will not be further described at present, saving to say that its columns I I', doors J, and windows K K', are kept in stock along with the front portion E and entablature D, and that its parts can be variously arranged to enable the first story, within the limits of variance in widths of the front portion E, to be widened more or less to correspond with the portion E.

Without changing the number or width of the windows G or the number or width of the columns F of the front portion E, that part of the building-front can, by omitting the sub-columns from it, or by embodying them in various widths in it, as described, be produced in various widths, ranging from, say, nineteen feet to twenty-five feet, and in all cases a satisfactory architectural effect will be obtained. By increasing the number, but without altering the width of the windows G and without changing the number of the principal columns—as, for instance, indicated by Fig. 7—the front can be further varied in width, and by varying the width of the sub-columns (shown in Fig. 7) the building-front can be further varied. By changing the number of the columns F the building-front can be further varied, especially when various widths of sub-columns are employed. In all these cases the first story and the entablature are made to conform to the portion E.

By reason of being able to combine the principal columns F and the sub-columns H, as described, this important result is obtained: A building-front of the class described can be supplied to the trade at less cost and more promptly than hitherto has been practicable, and as evidence of this I will state that I have sold these building-fronts from my shop in St. Louis into every State and Territory in the United States, saving the New England States, and it is my common practice to ship the fronts the very day the order therefor is received.

I desire not to be restricted to any special style of column F or sub-column H, as they can be variously shaped and ornamented without departing from the principle of the improvement.

Various modifications are illustrated in Figs. 11 to 22, inclusive.

I claim—

1. A building-front of the class described, whose portion between the top of the first story and the entablature of the second story thereof is capable of being widened or narrowed by means of wider or narrower sub-columns, substantially as described.

2. A building-front of the class described, whose portion between the top of the first story and the entablature of the second story thereof is capable of being widened or narrowed by means of wider or narrower sub-columns, and whose said entablature can be correspondingly widened or narrowed, substantially as described.

Witness my hand this 31st day of October, 1889.

BERNARD T. MESKER.

Witnesses:
C. D. MOODY,
D. W. A. SANFORD.